US012666287B2

(12) United States Patent
Hao et al.

(10) Patent No.: US 12,666,287 B2
(45) Date of Patent: Jun. 23, 2026

(54) CARRIER CONFIGURATION METHOD AND APPARATUS

(71) Applicant: HUAWEI TECHNOLOGIES CO., LTD., Shenzhen (CN)

(72) Inventors: Jinping Hao, Shanghai (CN); Yinghao Jin, Boulogne Billancourt (FR); Rui Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 18/184,744

(22) Filed: Mar. 16, 2023

(65) Prior Publication Data

US 2023/0224741 A1     Jul. 13, 2023

Related U.S. Application Data

(63) Continuation of application No. PCT/CN2021/111691, filed on Aug. 10, 2021.

(30) Foreign Application Priority Data

Sep. 21, 2020    (CN) .......................... 202010998502.3

(51) Int. Cl.
*H04W 24/08*        (2009.01)
*H04W 76/30*        (2018.01)

(52) U.S. Cl.
CPC ........... *H04W 24/08* (2013.01); *H04W 76/30* (2018.02)

(58) Field of Classification Search
CPC .............................. H04W 24/08; H04W 76/30
See application file for complete search history.

(56) References Cited

U.S. PATENT DOCUMENTS

| | | | |
|---|---|---|---|
| 2013/0329635 A1 | 12/2013 | Lee et al. | |
| 2019/0037425 A1* | 1/2019 | Hong .................... | H04W 72/23 |
| 2020/0059844 A1* | 2/2020 | Lee ....................... | H04W 80/02 |
| 2020/0162931 A1* | 5/2020 | Chakraborty ......... | H04W 48/10 |

FOREIGN PATENT DOCUMENTS

| | | |
|---|---|---|
| CN | 102948201 A | 2/2013 |
| CN | 104798396 A | 7/2015 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 10)", 3GPP TS 36.331 V10.21.0 (Sep. 2017), 317 pages.

* cited by examiner

*Primary Examiner* — Ricky Q Ngo
*Assistant Examiner* — Stephen N Steiner
(74) *Attorney, Agent, or Firm* — Maier & Maier, PLLC

(57)                ABSTRACT
A carrier configuration method. The method includes: a network device sends measurement configuration information to a terminal device, where the measurement configuration information includes configuration information of an event A1, and the measurement configuration information indicates the terminal device to perform measurement for the event A1 in a radio resource control (RRC) non-connected state.

16 Claims, 4 Drawing Sheets

CARRIER CONFIGURATION METHOD AND APPARATUS

CROSS-REFERENCE TO RELATED APPLICATIONS

This application is a continuation of International Application No. PCT/CN2021/111691, filed on Aug. 10, 2021, which claims priority to Chinese Patent Application No. 202010998502.3, filed on Sep. 21, 2020. The disclosures of the aforementioned applications are hereby incorporated by reference in their entireties.

TECHNICAL FIELD

The embodiments relate to the communication field, a carrier configuration method, and an apparatus.

BACKGROUND

With the rapid progress of wireless communication technologies, service requirements also increase explosively. However, spectrum resources owned by operators may be non-contiguous, and each single frequency band cannot meet the bandwidth requirements of services. To provide a higher service rate, various technologies including carrier aggregation (CA) are introduced into a communication system.

The CA technology supports aggregation of a plurality of contiguous or non-contiguous component carriers (CCs) into a larger bandwidth. Each CC that performs CA is an independent cell, including a primary cell (PCell) and a secondary cell (SCell). The PCell is a cell initially configured when a connection is set up. A CC corresponding to the PCell is an uplink and downlink primary component carrier (PCC), and a CC corresponding to the SCell is an uplink and downlink secondary component carrier (SCC). All serving cells that aggregate use a same frame structure, and all the serving cells have same uplink and downlink configurations.

When initially accessing a carrier, user equipment (UE) needs to receive public broadcast signaling sent on the carrier. The public broadcast signaling of the carrier includes at least a synchronization signal broadcast channel block (SSB) and a remaining minimum system information (RMSI). The SSB is a synchronization broadcast channel block (SSB) including a primary/secondary synchronization signal (PSS/SSS) and a broadcast channel (PBCH). The SSB may enable the UE to perform uplink and downlink timing synchronization and frequency synchronization with a carrier cell, so as to access the carrier. The RMSI is a necessary system message of the UE in an initial access process. To save energy, a base station may disable public broadcast signaling of some carriers in a plurality of carriers and may reserve only public broadcast signaling of some carriers for periodic sending. For example, when the base station sends both a high frequency carrier and a low frequency carrier, the base station may temporarily disable public broadcast signaling of the high frequency carrier and send public broadcast signaling of only the low frequency carrier. Alternatively, the base station sends only the SSB, and the sending period is relatively long. For example, the sending period is 160 ms. A carrier on which public broadcast signaling is not sent or a carrier that has a long sending period is referred to as an energy-saving carrier.

The energy-saving carrier may be scheduled at any time to send data. However, because the RMSI is not sent, the UE cannot access the energy-saving carrier in an initial access manner. When the UE is in a coverage area of the energy-saving carrier, because no SSB is sent on the energy-saving carrier, the UE cannot discover the energy-saving carrier, and the base station cannot determine whether the UE enters the coverage area of the energy-saving carrier. As a result, the UE cannot access the energy-saving carrier in time, which affects performance of the UE. Similarly, when an SSB is sent on the energy-saving carrier in a relatively long period, the UE needs a longer period of time for detection or the UE cannot detect the SSB in a limited period of time, which affects timely access of the UE and affects performance of the UE.

Therefore, how to notify the base station that the UE is in the coverage area of the energy-saving carrier, so as to help the UE quickly find the SSB of the energy-saving carrier and then access the energy-saving carrier is an urgent problem to be resolved.

SUMMARY

The embodiments may provide a carrier configuration method, so that a terminal device can quickly find an SSB of an energy-saving carrier, and then access the energy-saving carrier, thereby ensuring performance of the terminal device.

According to a first aspect, a carrier configuration method is provided. The method includes: A network device sends measurement configuration information to a terminal device, where the measurement configuration information includes configuration information of an event A1, and the measurement configuration information indicates the terminal device to perform measurement for the event A1 in a radio resource control RRC non-connected state.

According to the carrier configuration method provided in this embodiment, the event A1 is included in the measurement configuration information, so that when no SSB is sent in an energy-saving carrier cell and the terminal device cannot detect signal quality of an energy-saving carrier, the network device can effectively determine whether the terminal device enters the coverage area of the energy-saving carrier cell. In this way, the terminal device may quickly discover and then access the energy-saving carrier, thereby ensuring performance of the terminal device.

With reference to the first aspect, in some possible implementations, the method further includes: The network device receives a report of the event A1 sent by the terminal device. The network device sends access configuration information to the terminal device based on the report of the event A1, where the access configuration information indicates the terminal device to access a first carrier. The network device sends a first synchronization signal broadcast channel block SSB based on the report of the event A1. The first SSB is carried on the first carrier, and the first carrier is different from a second carrier that carries the measurement configuration information.

With reference to the first aspect, in some possible implementations, that a network device sends measurement configuration information to a terminal device includes: The network device sends an RRC release message to the terminal device, where the RRC release message includes the measurement configuration information.

Optionally, that a network device sends measurement configuration information to a terminal device includes: The network device sends a system information block SIB message to the terminal device, where the SIB message includes the measurement configuration information.

With reference to the first aspect, in some possible implementations, the method further includes: The measurement configuration information further includes a period of a second SSB, and the second SSB is carried on the second carrier.

The event A1 is added to the measurement configuration information, so that when no SSB is sent in an energy-saving carrier cell and the terminal device cannot detect signal quality of an energy-saving carrier, the network device can effectively determine whether the terminal device enters the coverage area of the energy-saving carrier cell, and enable the energy-saving carrier on which the terminal device is located to start to send an SSB. In this way, the terminal device may quickly discover and then access the energy-saving carrier, thereby ensuring performance of the terminal device.

According to a second aspect, a carrier configuration method is provided. The method includes: A terminal device receives measurement configuration information sent by a network device, where the measurement configuration information includes configuration information of an event A1. The terminal device performs measurement for the event A1 in an RRC non-connected state based on the measurement configuration information.

With reference to the second aspect, in some possible implementations, the method further includes: The terminal device sends a report of the event A1 to the network device. The terminal device receives access configuration information sent by the network device, where the access configuration information indicates the terminal device to access a first carrier. The terminal device searches for a first SSB, where the first SSB is carried on the first carrier, and the first carrier is different from a second carrier that carries the measurement configuration information.

With reference to the second aspect, in some possible implementations, that a terminal device receives measurement configuration information sent by a network device includes: The terminal device receives an RRC release message sent by the network device, where the RRC release message includes the measurement configuration information.

Optionally, that a terminal device receives measurement configuration information sent by a network device includes: The terminal device receives a SIB message sent by the network device, where the SIB message includes the measurement configuration information.

With reference to the second aspect, in some possible implementations, the measurement configuration information further includes a period of a second SSB, and the second SSB is carried on the second carrier. The method further includes: The terminal device searches for the second SSB based on the period of the second SSB.

The event A1 is added to the measurement configuration information, so that when no SSB is sent in an energy-saving carrier cell and the terminal device cannot detect signal quality of an energy-saving carrier, the network device can effectively determine whether the terminal device enters the coverage area of the energy-saving carrier cell, and enable the energy-saving carrier on which the terminal device is located to start to send an SSB. In this way, the terminal device may quickly discover and then access the energy-saving carrier, thereby ensuring performance of the terminal device.

According to a third aspect, a carrier configuration method is provided. The method includes: A network device sends measurement configuration information to a terminal device, where the measurement configuration information includes a period of a third SSB.

With reference to the third aspect, in some possible implementations, the measurement configuration information indicates the terminal device to perform measurement in an RRC non-connected state.

With reference to the third aspect, in some possible implementations, that a network device sends measurement configuration information to a terminal device includes: The network device sends a radio resource control RRC release message to the terminal device, where the RRC release message includes the measurement configuration information.

Optionally, the network device sends a system information block SIB message to the terminal device, where the SIB message includes the measurement configuration information.

With reference to the third aspect, in some possible implementations, the measurement configuration information indicates the terminal device to perform measurement in an RRC connected state.

A network device may send measurement configuration information to a terminal device. The network device may send an RRC reconfiguration message to the terminal device, where the RRC reconfiguration message includes the measurement configuration information.

The period of the third SSB is added to the measurement configuration information, and the period of the third SSB is periodically sent to the terminal device, so that for a third carrier cell in which only an SSB is sent and a sending period is different from that of a second carrier, the terminal device may more flexibly find the third SSB based on the period of the third SSB, and then access the third SSB. In this way, searching complexity of the terminal device is reduced, energy consumption of the terminal device is reduced, and performance of the terminal device is ensured.

According to a fourth aspect, a carrier configuration method is provided. The method includes: A terminal device receives measurement configuration information sent by a network device, where the measurement configuration information includes a period of a third SSB. The terminal device searches, based on the period of the third SSB, for the third SSB carried on a third carrier.

With reference to the fourth aspect, in some possible implementations, the measurement configuration information indicates the terminal device to perform measurement in an RRC non-connected state.

With reference to the fourth aspect, in some possible implementations, that a terminal device receives measurement configuration information sent by a network device includes: The terminal device receives an RRC release message sent by the network device, where the RRC release message includes the measurement configuration information.

Optionally, that a terminal device receives measurement configuration information sent by a network device includes: The terminal device receives a SIB message sent by the network device, where the SIB message includes the measurement configuration information.

With reference to the fourth aspect, in some possible implementations, the measurement configuration information indicates the terminal device to perform measurement in an RRC connected state.

A terminal device may receive measurement configuration information sent by a network device. The terminal device may receive an RRC reconfiguration message sent by the network device, where the RRC reconfiguration message includes the measurement configuration information.

The period of the third SSB is added to the measurement configuration information, and the period of the third SSB is periodically sent to the terminal device, so that for an energy-saving carrier cell in which only the third SSB is sent and a sending period is different from that of a second carrier, the terminal device may more flexibly find the third SSB based on the period of the third SSB, and then access the third SSB. In this way, searching complexity of the terminal device is reduced, energy consumption of the terminal device is reduced, and performance of the terminal device is ensured.

According to a fifth aspect, a carrier configuration apparatus is provided. The apparatus includes a sending unit, where the sending unit is configured to send measurement configuration information to a terminal device, where the measurement configuration information includes configuration information of an event A1, and the measurement configuration information indicates the terminal device to perform measurement for the event A1 in an RRC non-connected state.

With reference to the fifth aspect, the apparatus may further include a receiving unit. The receiving unit is configured to receive a report of the event A1 sent by the terminal device. The sending unit is further configured to: send access configuration information to the terminal device based on the report of the event A1, where the access configuration information indicates the terminal device to access a first carrier and send a first synchronization signal broadcast channel block SSB based on the report of the event A1. The first SSB is carried on the first carrier, and the first carrier is different from a second carrier that carries the measurement configuration information.

With reference to the fifth aspect, the sending unit is further configured to send a radio resource control RRC release message to the terminal device, where the RRC release message includes the measurement configuration information.

Optionally, the sending unit may be configured to send a system information block SIB message to the terminal device, where the SIB message includes the measurement configuration information.

With reference to the fifth aspect, the measurement configuration information in the sending unit further includes a period of a second SSB, and the second SSB is carried on the second carrier.

According to a sixth aspect, a carrier configuration apparatus is provided. The apparatus includes: a receiving unit, where the receiving unit is configured to receive measurement configuration information sent by a network device, and the measurement configuration information includes configuration information of an event A1; and a performing unit, where the performing unit is configured to perform measurement for the event A1 in an RRC non-connected state based on the measurement configuration information.

With reference to the sixth aspect, the apparatus may further include a sending unit, where the sending unit is configured to send a report of the event A1 to the network device. The receiving unit is further configured to receive access configuration information sent by the network device, where the access configuration information indicates the terminal device to access a first carrier, and the first carrier is different from a second carrier that carries the measurement configuration information. The performing unit is further configured to search for a first SSB, where the first SSB is carried on the first carrier.

With reference to the sixth aspect, the receiving unit is further configured to receive an RRC release message sent by the network device, where the RRC release message includes the measurement configuration information.

Optionally, the receiving unit may be configured to receive a SIB message sent by the network device, where the SIB message includes the measurement configuration information.

With reference to the sixth aspect, the measurement configuration information further includes a period of a second SSB, and the second SSB is carried on the second carrier. The performing unit is further configured to search for the second SSB based on the period of the second SSB.

According to a seventh aspect, a carrier configuration apparatus is provided. The apparatus includes a sending unit, where the sending unit is configured to send measurement configuration information to a terminal device, where the measurement configuration information includes a period of a third SSB.

With reference to the seventh aspect, the measurement configuration information indicates the terminal device to perform measurement in an RRC non-connected state.

With reference to the seventh aspect, the sending unit is further configured to send measurement configuration information to the terminal device, and send a radio resource control RRC release message to the terminal device, where the RRC release message includes the measurement configuration information.

Optionally, the sending unit may be configured to send a system information block SIB message to the terminal device, where the SIB message includes the measurement configuration information.

With reference to the seventh aspect, the measurement configuration information indicates the terminal device to perform measurement in an RRC connected state.

The sending unit may be configured to send an RRC reconfiguration message to the terminal device, where the RRC reconfiguration message includes the measurement configuration information.

According to an eighth aspect, a carrier configuration apparatus is provided. The apparatus includes: a receiving unit, where the receiving unit is configured to receive measurement configuration information sent by a network device, where the measurement configuration information includes a period of a third SSB; and a performing unit, where the performing unit is configured to search, based on the period of the third SSB, for the third SSB carried on the third carrier.

With reference to the eighth aspect, the measurement configuration information indicates the terminal device to perform measurement in an RRC non-connected state.

With reference to the eighth aspect, the receiving unit is further configured to receive an RRC release message sent by the network device, where the RRC release message includes the measurement configuration information.

Optionally, the receiving unit may be configured to receive a SIB message sent by the network device, where the SIB message includes the measurement configuration information.

With reference to the eighth aspect, the measurement configuration information indicates the terminal device to perform measurement in an RRC connected state.

The receiving unit may be further configured to receive an RRC reconfiguration message sent by the network device, where the RRC reconfiguration message includes the measurement configuration information.

According to a ninth aspect, a carrier configuration apparatus is provided. A structure of the carrier configuration apparatus includes a processor. The processor is configured to support the carrier configuration apparatus in performing the functions in the first aspect to the fourth aspect and the implementations of the first aspect to the fourth aspect. The carrier configuration apparatus may further include a transceiver, configured to support the carrier configuration apparatus in receiving or sending information.

The carrier configuration apparatus may further include a memory. The memory is coupled to the processor and is configured to store program instructions and data that are necessary for the carrier configuration apparatus.

In other words, the carrier configuration apparatus includes a memory and a processor. The memory is configured to store a computer program, and the processor is configured to invoke the computer program from the memory and run the computer program, to enable the carrier configuration apparatus to perform the communication method in any one of the first aspect to the fourth aspect and the implementations of the first aspect to the fourth aspect.

According to a tenth aspect, a computer program product is provided. The computer program product includes a computer program. When being executed by a processor, the computer program is configured to perform the communication method in any possible implementation of the first aspect to the fourth aspect.

According to an eleventh aspect, a non-transitory computer-readable storage medium is provided. The non-transitory computer-readable storage medium stores a computer program. When being executed, the computer program is configured to perform the method according to any possible implementation of the first aspect to the fourth aspect.

DETAILED DESCRIPTION OF THE EMBODIMENTS

The following describes the embodiments with reference to the accompanying drawings.

The embodiments may be applied to various communication systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th-generation (5G) system, or a new radio (NR) system.

A terminal device may also be referred to as user equipment, an access terminal, a subscriber unit, a subscriber station, a mobile station, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited.

A network device may be a device configured to communicate with the terminal device. The network device may be a base transceiver station (BTS) in a global system for mobile communications (GSM) system or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited.

The following describes the embodiments in detail with reference to the accompanying drawings. It can be understood that, in the following embodiments, terms such as "first" and "second" are merely intended to distinguish between different objects, and should not constitute any limitation.

Figure 1:
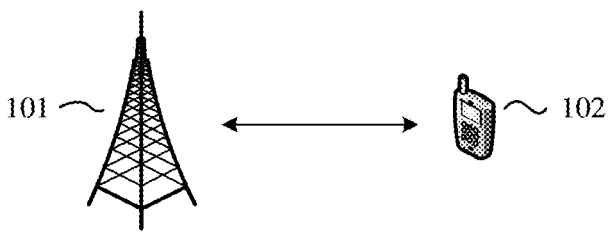
FIG. 1 is a schematic diagram of a communication system.

FIG. 1 is a schematic diagram of a communication system 100 applicable to a signal sending and receiving method and an apparatus according to an embodiment. As shown in the figure, the communication system 100 may include at least one network device such as a network device 101 shown in FIG. 1. The communication system 100 may further include at least one terminal device such as a terminal device 102 shown in FIG. 1. The network device 101 and the terminal device 102 may communicate with each other through a radio link.

Figure 2:
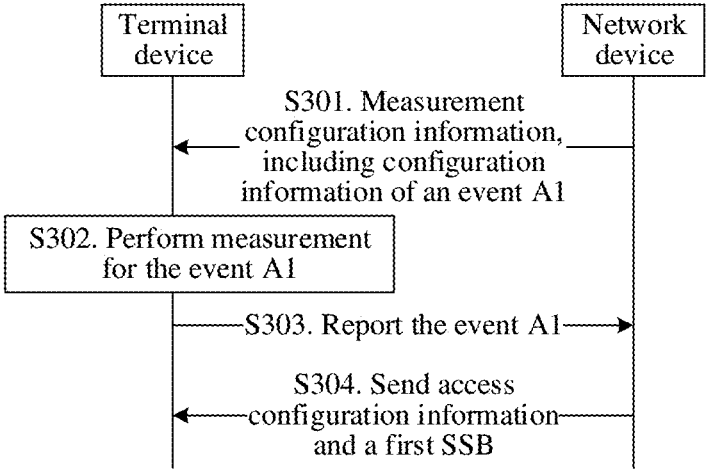
FIG. 2 is another schematic diagram of a communication system.

FIG. 2 is another schematic diagram of a communication system 200 applicable to a signal sending and receiving method and an apparatus according to an embodiment. As shown in the figure, the communication system 200 may include at least two network devices such as network devices 201 and 202 shown in FIG. 2. The communication system 200 may further include at least one terminal device such as a terminal device 203 shown in FIG. 2. The terminal device 203 may establish radio links with the network device 201 and the network device 202 by using a dual connectivity (DC) technology or a multi-connectivity technology. The network device 201 may be, for example, a primary base station, and the network device 202 may be, for example, a secondary base station. In this case, the network device 201 is a network device used when the terminal device 203 performs initial access, and is responsible for radio resource control (RRC) communication with the terminal device 203. The network device 202 may be added during RRC reconfiguration, and is configured to provide an additional radio resource.

The network device 202 may alternatively be a primary base station, and the network device 201 may alternatively be a secondary base station. This is not limited. In addition, for ease of understanding only, the figure shows a case in which the two network devices are wirelessly connected to the terminal device. However, this should not constitute any limitation on a scenario. The terminal device may further establish radio links with more network devices.

A plurality of antennas may be configured for each communication device such as the network device 101 or the terminal device 102 in FIG. 1 or the network device 201, the network device 202, or the terminal device 203 in FIG. 2. The plurality of antennas may include at least one transmit antenna for sending a signal and at least one receive antenna for receiving a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multiple-antenna technology.

It can be understood that the network device in the wireless communication system may be any device that has a wireless transceiver function. The device includes, but is not limited to: an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. The device may alternatively be a gNB or a transmission point (TRP or TP) in a 5G system, for example, an NR system, or one antenna panel or a group of antenna panels (including a plurality of antenna panels) of a base station in a 5G system, or the device may alternatively be a network node that constitutes a gNB or a transmission point, for example, a baseband unit (BBU) or a distributed unit (DU).

In some deployments, the gNB may include a central unit (CU) and a DU. The gNB may further include a radio frequency unit (RFU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer eventually becomes information at the PHY layer or is transformed from the information at the PHY layer. Therefore, in this architecture, it may also be considered that higher layer signaling such as RRC layer signaling is sent by the DU or is sent by the DU and the CU. It may be understood that the network device may be a CU node, a DU node, or a device including a CU node and a DU node. In addition, the CU may be classified as a network device in a radio access network (RAN), or may be classified as a network device in a core network (CN). This is not limited.

It can be further understood that the terminal device in the wireless communication system may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may be a mobile phone, a tablet computer (pad), a computer with a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited.

In an application scenario, the network device periodically broadcasts some system messages and may send public information of network access stratum and non-access stratums to the terminal device. The public information of the non-access stratum may include operator information. The public information of the access stratum may include master information block (MIB) messages and system information block (SIB) messages, including access configuration related information (such as a frequency domain position, a period, and a subframe offset), a preamble group, a format, and the like.

After entering a cell, the terminal device receives public broadcast information of the cell. Validity of the cell is checked first to determine whether the cell is suitable for the terminal device to camp on. Related information about neighboring cells may be obtained based on the system messages broadcast by the network device, and the terminal device may select a cell with a best signal to camp on and initiate random access. After completing cell selection, the terminal device implements downlink synchronization with the to-be-accessed cell based on the public broadcast information, and in this case, may start to initiate random access.

Figure 3:
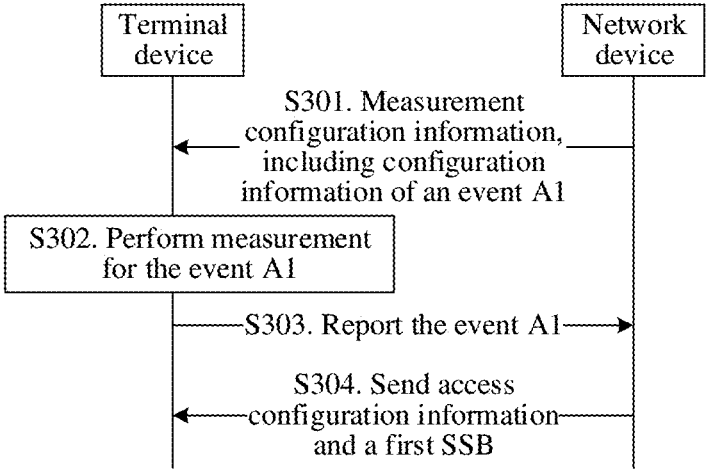
FIG. 3 is a schematic flowchart of a carrier configuration method.

FIG. 3 is a schematic flowchart of a carrier configuration method according to an embodiment.

S301: A network device sends measurement configuration information to a terminal device, where the measurement configuration information includes configuration information of an event A1, and the measurement configuration information indicates the terminal device to perform measurement for the event A1 in an RRC non-connected state. The event A1 is described as: Quality of a serving cell is greater than a threshold. After the event A1 is configured for the terminal device, when the signal quality of the serving cell meets a condition of exceeding the threshold, the terminal device reports the event A1, and does not report the event A1 if the condition is not met. The threshold may be flexibly set based on different scenarios.

In an initial access process, the terminal device needs to perform measurement on broadcast signals in a plurality of cells. Because it takes a relatively long period of time to perform measurement on a neighboring cell after the terminal device enters an RRC connected state, the terminal device may perform measurement on the neighboring cell in advance in the RRC non-connected state. This process is referred to as early measurement. After performing early measurement, the terminal device selects a cell with best broadcast signal quality from the plurality of cells for access. Because no SSB nor other public broadcast signaling is sent in a carrier cell in an energy-saving state, the terminal device cannot perform measurement on broadcast signals in the energy-saving carrier cell and cannot access the energy-saving carrier cell. Therefore, when the terminal device is configured to perform early measurement, the configuration information of the event A1 may be included in the measurement configuration information, so that after detecting the event A1, the terminal device reports the event A1 to the network device by using an RRC message for reporting a measurement result of the broadcast signal quality. The network device may determine, based on the received event A1, a distance between the terminal device and the network device, and further determine whether the terminal device is in the coverage area of the energy-saving carrier. The measurement configuration information is carried on a carrier on which an SSB is normally sent.

It can be understood that the configuration information of the event A1 may be included to all messages that can carry the measurement configuration information. When the network device releases the terminal device to enter the RRC non-connected state, a new information element (IE) may be included in some information elements of the RRC release message, to configure the event A1. For example, a "reportconfig" information element for indicating the terminal device to measure and report the event A1 may be added to a "MeasIdleConfig-r16" information element for configuring early measurement in the RRC release message. The "reportconfig" information element includes two information elements "reportConfigNR" and/or "reportConfigInterRAT". Each of the two information elements includes a "reportType" information element whose value is "eventA1", to configure the event A1. A cell structure may be as follows:

```
MeasIdleCarrierNR-r16:=     SEQUENCE {
    CarrierFreqNR-R16          ARFCN-ValueNR,
    ssbSubcarrierSpacing-rl6   SubcarrierSpacing
    frequencyBandList          MultiFrequencyBandListNR
OPTIONAL,
    measCellListNR-r16         CellListNR-r16
OPTIONAL,
    reportQuantities-r16       ENUMERATED {rsrp, rsrq, both},
    reportconfig               CHOICE {
      reportConfigNR              ReportConfigNR
    . . . ,
    ReportConfigInterRAT          ReportConfigInterRAT}}
ReportConfigNR::=           SEQUENCE {
    reportType                 CHOICE {
      eventTriggered              eventA1,
      . . . ,}}
```

Optionally, when the terminal device is in the RRC non-connected state, a new information element is added to a SIB message in public broadcast signaling sent by the network device, to configure the event A1. For example, a "reportconfig" information element for indicating the terminal device to measure and report the event A1 may be added to a "measIdleConfigSIB-r16" information element for configuring early measurement in the SIB message. A structure of the "reportconfig" information element is described as above. A structure of another information element is, for example, the same as that in 3GPP TS 38.331 V16.1.0. Details are not described herein again.

S302: The terminal device performs measurement for the event A1.

the terminal device may perform measurement on signal quality of a serving cell in which the terminal device is located. Content of the measurement may be reference signal received power (RSRP) and/or reference signal received quality (RSRQ). The terminal device compares the measurement result with a preset threshold. The threshold is preset based on an actual requirement. This is not limited.

S303: The terminal device reports the event A1 to the network device.

When the signal quality of the serving cell measured by the terminal device meets the condition of exceeding the preset threshold in the event A1, the terminal device reports the event A1 to the network device. The terminal device may report a measurement result of the broadcast signal quality in the early measurement process and may report the event A1 to the network device by using an RRC message for reporting the measurement result. If the network device receives the report of the event A1, it indicates that the carrier signal quality of the cell accessed by the terminal device is relatively good, there is a relatively high probability that the terminal device is close to the network device site, and there is a relatively high probability that the terminal device is covered by a high-frequency energy-saving carrier.

If the broadcast signal quality measured by the terminal device does not meet the condition of exceeding the preset threshold in the event A1, the terminal device does not report the event A1. The network device does not receive the report of the event A1, continues to enable the terminal device to access the carrier of the cell selected for access in the early measurement process, and serves the terminal device on the carrier.

S304: The network device sends access configuration information and a first SSB to the terminal device.

After receiving the report of the event A1, the network device sends the access configuration information to the terminal device. The access configuration information indicates the terminal device to access an original energy-saving carrier, and includes information used for access, such as RMSI of the original energy-saving carrier, and configures a cell corresponding to the original energy-saving carrier as a secondary cell. Because the original energy-saving carrier and the carrier of the cell accessed by the terminal device are carriers sent by a same site, that is, the two carriers are co-sited, the network device may start to send the first SSB on the original energy-saving carrier. When the first SSB starts to be sent on the original energy-saving carrier, the original energy-saving carrier is no longer an energy-saving carrier, but is changed to an operating carrier, which is also referred to as a first carrier. Therefore, the terminal device can find an SSB of the first carrier, and can access the first carrier based on the RMSI information. The first carrier may be a high-frequency carrier. Performance of the terminal device can be ensured by transmitting data on the first carrier.

Optionally, after receiving the report of the event A1, the network device sends a switching command to the terminal device. The switching command indicates the terminal device to switch to a cell corresponding to the original energy-saving carrier. The network device starts to send the first SSB on the original energy-saving carrier. When the first SSB starts to be sent on the original energy-saving carrier, the original energy-saving carrier is no longer an energy-saving carrier, but is changed to an operating carrier, that is, the first carrier. Therefore, the terminal device can find an SSB of the original energy-saving carrier, then switch to the cell corresponding to the original energy-saving carrier, and can also send data on the original energy-saving carrier, thereby ensuring performance of the terminal device.

The event A1 is added to the measurement configuration information, so that when no SSB is sent on the energy-saving carrier and the terminal device cannot detect signal quality of the energy-saving carrier, the network device can effectively determine whether the terminal device enters the coverage area of the energy-saving carrier cell, and enable the terminal device to send an SSB on the original energy-saving carrier. The energy-saving carrier on which the terminal device is located is changed to the first carrier. In this way, the terminal device may quickly discover and then access the first carrier, thereby ensuring performance of the terminal device.

Optionally, a period of a second SSB may be further configured in the measurement configuration information in S301. The second SSB is carried on a second carrier. The second carrier may be a carrier on which an SSB is normally sent. The second carrier carries the measurement configuration information, and is different from the first carrier. When the terminal device does not receive related information of the SSB, detection on the SSB may be blind detection. If the terminal device receives the period of the second SSB in the measurement configuration information, the terminal device can more easily find the SSB of the second carrier based on the information about the period of the second SSB in the measurement configuration information, and access the second carrier, to reduce energy consumption of the terminal device.

When accessing the network device, the terminal device needs to perform synchronization by using a found SSB and measure signal quality of a serving cell. When a period of sending an SSB on a carrier is relatively long, for example, 160 ms, the terminal device needs to detect the SSB for a longer period of time, or the terminal device cannot detect the SSB within a limited period of time. In this case, timely access of the terminal device is affected. Therefore, an SSB period may be configured in the early measurement, so that the terminal device can detect the SSB more easily.

Figure 4:
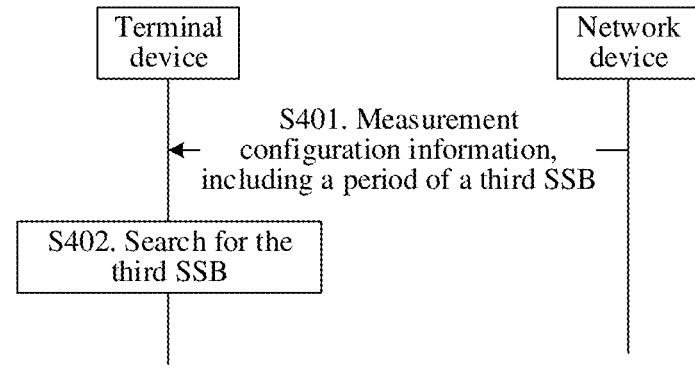
FIG. 4 is a schematic flowchart of another carrier configuration method.

FIG. 4 is a schematic flowchart of another carrier configuration method according to an embodiment.

S401: A network device sends measurement configuration information to a terminal device, where the measurement configuration information includes a period of a third SSB.

In an initial access process, the terminal device needs to perform measurement on broadcast signals of a plurality of cells, and select a cell with best broadcast signal quality from the plurality of cells for access. When the terminal device is in a coverage area of a third carrier on which only an SSB is sent and that has a relatively long sending period, the terminal device needs a longer period of time to perform SSB detection, or cannot detect an SSB within a limited period of time. In this case, timely access of the terminal device is affected. Therefore, the period of the third SSB may be added to the measurement configuration information sent by the network device to the terminal device, so that the terminal device can find the third SSB more flexibly after receiving the period of the third SSB. In this way, unnecessary SSB blind detection is reduced, a case that the terminal device cannot detect an SSB within a limited period of time is avoided, and an access delay is reduced. The measurement configuration information sent by the network device to the terminal device is carried on a second carrier, and the second carrier may be a carrier on which an SSB is normally sent. The third SSB is an SSB sent on a third carrier, and the third carrier may be a carrier on which only an SSB is sent and that has a sending period different from the second carrier.

It can be understood that configuration information of an SSB period may be added to all messages that can carry the measurement configuration information. When the network device releases the terminal device to enter an RRC non-connected state, a new information element may be added to an RRC release message, to configure the SSB period. For example, an "SSB period" information element may be added to a configuration related to information about the third SSB in a "MeasIdleConfig-r16" information element for configuring early measurement in the RRC release message, to indicate the SSB period of the to-be-measured third carrier. For example, a value of the "SSB period" may be, for example, any one of "ms20", "ms40", "ms80", and "ms160", or may be another period value. A cell structure may be as follows:

```
MeasIdleCarrierNR-r16::=    SEQUENCE{
    CarrierFreqNR-R16          ARFCN-ValueNR,
    ssbSubcarrierSpacing-r16   SubcarrierSpacing
    ssbperiod                  ENUMERATED{ms20, ms40,
ms80, ms160},
    frequencyBandList          MultiFrequencyBandListNR
  OPTIONAL,
    measCellListNR-r16         CellListNR-r16
  OPTIONAL,
    reportQuantities-r16       ENUMERATED {rsrp, rsrq, both},}
```

Optionally, when the terminal device is in the RRC non-connected state, a new information element may be added to some information elements of a SIB message in public broadcast signaling sent by the network device, to configure the period of the third SSB. For example, an "SSB period" information element may be added to a "measIdle-ConfigSIB-r16" information element of the SIB message, to indicate the SSB period of the to-be-measured third carrier. A structure of the "SSB period" information element is described above. A structure of another information element is, for example, the same as that in 3GPP TS 38.331 V16.1.0. Details are not described herein again.

S402: The terminal device searches for the third SSB based on the measurement configuration information.

The terminal device searches for the third SSB in the RRC non-connected state based on the period of the third SSB in the measurement configuration information, performs measurement on signal quality of the third carrier, and reports a measurement result in an early measurement process performed by the terminal device. In the early measurement process, if the RRC release message indicates that the terminal device enters an inactive state, a message carrying the measurement result is an RRC resume complete message. If the RRC release message indicates that the terminal device enters an idle state, a message carrying the measurement result is an RRC setup complete message. The network device chooses, based on the measurement result of the third carrier, to configure a third carrier cell as a secondary cell, or chooses to switch to the third carrier cell.

This embodiment does not limit a deployment scenario. A serving cell and the third carrier cell may be co-sited or may not be co-sited. That is, the serving cell and the third carrier cell may be carriers sent by a same site, or may be carriers sent by different sites. The terminal device searches for the third SSB based on the measurement configuration information, performs measurement on signal quality of the third carrier, and reports a measurement result to the network device. The network device chooses, based on the measurement result reported by the terminal device, to configure the third carrier cell as a secondary cell, or chooses to switch to the third carrier cell. In an RRC reconfiguration message sent when the terminal device accesses the network device, the network device sends, to the terminal device, information used for access, such as RMSI of the third carrier, so that the terminal device can access the third carrier. The third carrier may be a high-frequency carrier, and performance of the terminal device can be ensured by transmitting data on the third carrier.

The period of the third SSB is added to the measurement configuration information, so that for the third carrier cell in which only an SSB is sent and a sending period is different from that of the second carrier, the terminal device may quickly find and then access the third SSB based on the period of the third SSB. In this way, searching complexity of the terminal device is reduced, energy consumption of the terminal device is reduced, and performance of the terminal device is ensured.

Figure 5:
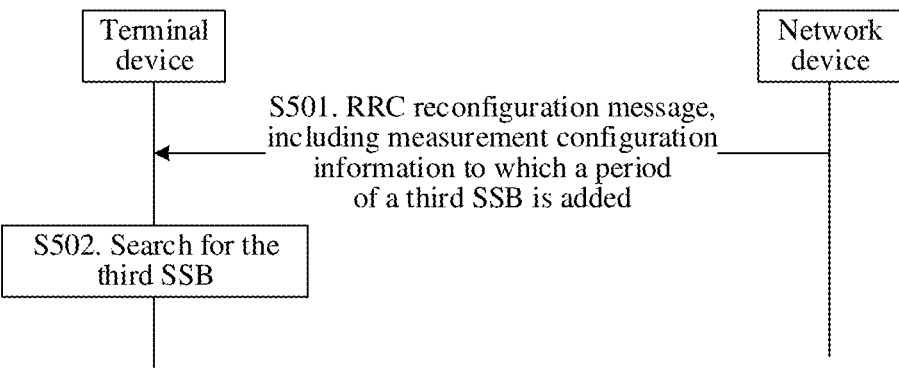
FIG. 5 is a schematic flowchart of yet another carrier configuration method.

FIG. 5 is a schematic flowchart of another carrier configuration method according to an embodiment.

S501: A network device sends an RRC reconfiguration message to a terminal device, where the RRC reconfiguration message includes measurement configuration information to which a period of a third SSB is added.

The network device may send the measurement configuration information to the terminal device when the terminal device is in an RRC connected state, and add information related to the period of the third SSB to the measurement configuration information. An SSB period of a third carrier is different from an SSB period of a second carrier. The period of the third SSB may be added when the measurement configuration information is configured in the RRC reconfiguration message. For example, an "SSB period" information element is added to a "MeasObjectNR" information element in a "MeasConfig" information element of the RRC reconfiguration message, to indicate the SSB period of the to-be-measured third carrier. An information element structure may be as follows:

```
MeasObjectNR::=          SEQUENCE {
    ssbFrequency            ARFCN-ValueNR,
    ssbSubcarrierSpacing    SubcarrierSpacing
    ssbperiod               ENUMERATED{ms20, ms40, ms80,
ms160}}
```

It can be understood that, in a process of configuring measurement in an existing procedure, an RRC message for configuring measurement for the terminal device may be used as a carrier to add the "SSB period" information element to a corresponding information element, to indicate an SSB period of a to-be-measured carrier cell.

S502: The terminal device searches for the third SSB based on a measurement configuration message.

The terminal device searches for the third SSB in the RRC connected state based on the period of the third SSB in the measurement configuration message, performs measurement, and reports a measurement result to the network device. The network device chooses, based on the measurement result, to configure a carrier cell for sending the third SSB as a secondary cell, or chooses to switch to the cell.

This embodiment does not limit a scenario. A third carrier cell and a second carrier cell may be co-sited or may not be co-sited. The terminal device searches for the third SSB based on the measurement configuration information, performs measurement on signal quality of the third carrier, and reports a measurement result to the network device. The network device chooses, based on the measurement result reported by the terminal device, to configure the third carrier cell as a secondary cell, or chooses to switch to the third carrier cell. In the RRC reconfiguration message sent when the terminal device accesses the network device, the network device sends, to the terminal device, information used for access, such as RMSI of the third carrier, so that the terminal device can access the third carrier. The third carrier may be a high-frequency carrier, and performance of the terminal device can be ensured by transmitting data on the third carrier.

The period of the third SSB is added to the measurement configuration information, so that the terminal device may more easily find and then access the third SSB based on the period of the third SSB. In this way, searching complexity of the terminal device is reduced, energy consumption of the terminal device is reduced, and performance of the terminal device is ensured.

Figure 6:
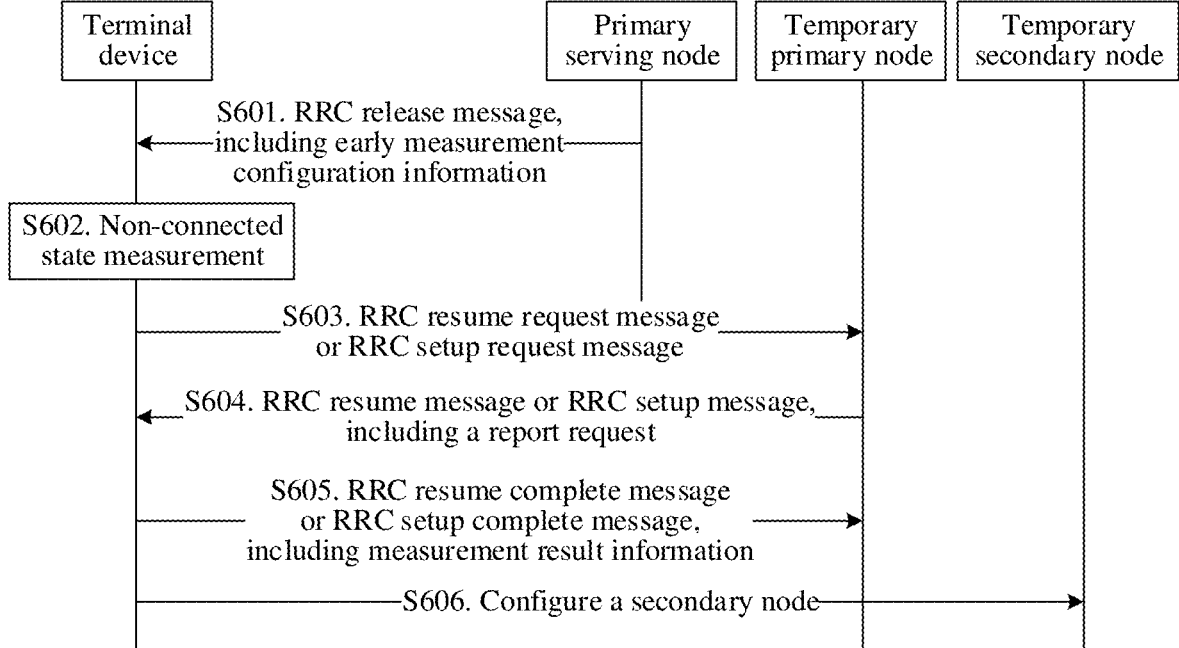
FIG. 6 is a schematic flowchart of an early measurement process.

FIG. 6 is a schematic flowchart of an early measurement process to which an embodiment is applied. Because it takes a relatively long period of time to perform measurement on a neighboring cell after a terminal device enters an RRC connected state, the terminal device may perform measurement on the neighboring cell in advance in an RRC non-connected state. This process is referred to as early measurement. The RRC non-connected state includes an RRC idle state and an RRC inactive state. An example in which the carrier configuration method shown in FIG. 3 is applied to the early measurement process shown in FIG. 6 is used below for description.

S601: A primary serving node sends an RRC release message to a terminal device, where the RRC release message includes early measurement configuration information. The primary serving node is a serving node to which a serving cell connected to the terminal device before the terminal device receives the RRC release message belongs. After receiving the RRC release message, the terminal device enters a non-connected state, and the non-connected state includes an idle state and an inactive state. The primary serving node may send the early measurement configuration information to the terminal device in the RRC release message, so that the terminal device performs measurement on signal quality of a neighboring cell before re-establishing an RRC connection. In this way, measurement information of the neighboring cell is carried in the RRC message, to quickly configure a secondary cell for the terminal device. A configuration of an event A1 may be added to the early measurement configuration information. The event A1 may be carried in the RRC release message sent by the primary serving node to the terminal device.

S602: The terminal device performs measurement on the neighboring cell in the RRC non-connected state. When using a carrier aggregation technology to configure and add a secondary cell, the network device may need to obtain a measurement result uploaded by the terminal device, and determine, by using each physical cell identifier (PCI) and RSRP and/or RSRQ of each physical cell that are recorded in the measurement result, whether to add the secondary cell and which physical cell is selected as the secondary cell.

S603: The terminal device sends an RRC resume request message or an RRC setup request message to the network device. In S601, if the RRC release message sent by the primary serving node to the terminal device indicates that the terminal device enters the inactive state, the RRC resume request message is sent by the terminal device to the network device in a connection re-establishment process. If the RRC release message sent by the primary serving node to the terminal device indicates that the terminal device enters the idle state, the RRC setup request message is sent by the terminal device to the network device. The terminal device may send the RRC resume request message or the RRC setup request message to a temporary primary node, where the temporary primary node is a network device to be accessed by the terminal device, and the primary serving node is a network device that provides a service for the terminal in S601. The temporary primary node may be the same as or different from the primary serving node. S604: The network device sends an RRC resume message or an RRC setup message to the terminal device, where the RRC resume or the RRC setup message includes a report request, and the report request indicates the terminal device to report a measurement result to the network device after the terminal device measures signal quality of a serving cell. If the terminal device sends the RRC setup request message in S603, the network device correspondingly sends the RRC setup message in S604. If the terminal device sends the RRC resume request message in S603, the network device correspondingly sends the RRC resume message in S604.

S605: The terminal device sends an RRC resume complete message or an RRC setup complete message to the network device, where the RRC resume complete message or the RRC setup complete message includes measurement result information. If the terminal device sends the RRC setup request message in S603, the network device correspondingly sends the RRC setup complete message in S605. If the terminal device sends the RRC resume request message in S603, the network device correspondingly sends the RRC resume complete message in S605. The terminal device reports the measurement result to the network device in the RRC resume/setup complete message. The measurement result may include signal quality of a neighboring cell and an event A1 that meets a condition. After performing measurement on the serving cell, if the condition for reporting the event A1 is met, the terminal device may include, in the RRC resume/setup complete message, information reported in the event A1, to complete the report of the event A1.

S606: The network device configures a secondary node for the terminal device. The network device configures the secondary node based on the measurement information reported by the terminal device, so that the terminal device can access the secondary node.

Optionally, if the terminal device configures measurement in an existing procedure in the RRC connected state, after the network device sends a terminal device information request message to the terminal device, the terminal device may send a terminal device information request response message to the network device, where the terminal device information request response message includes the measurement result information. The measurement result may include signal quality of a neighboring cell and an event A1 that meets a condition. After performing measurement on a serving cell, if the condition for reporting the event A1 is met, the terminal device may include, in a terminal device information request response message, information reported in the event A1, to complete the report of the event A1.

The terminal device performs measurement on signal quality in advance in the RRC non-connected state and completes the report of the event A1 in the early measurement process. In this way, the terminal device may quickly discover an energy-saving carrier that can be accessed, and then start to send an SSB on an original energy-saving carrier, that is, perform access on a first carrier, to ensure performance of the terminal device. For the terminal device in the RRC connected state, the information reported in the event A1 is included in a message for configuring measurement in an existing procedure, so that the terminal device may also quickly discover and then access the original energy-saving carrier, thereby ensuring performance of the terminal device. In addition, the report of the event A1 is carried in the early measurement process, and no additional signaling or message needs to be added. This can reduce overheads.

Figure 7:
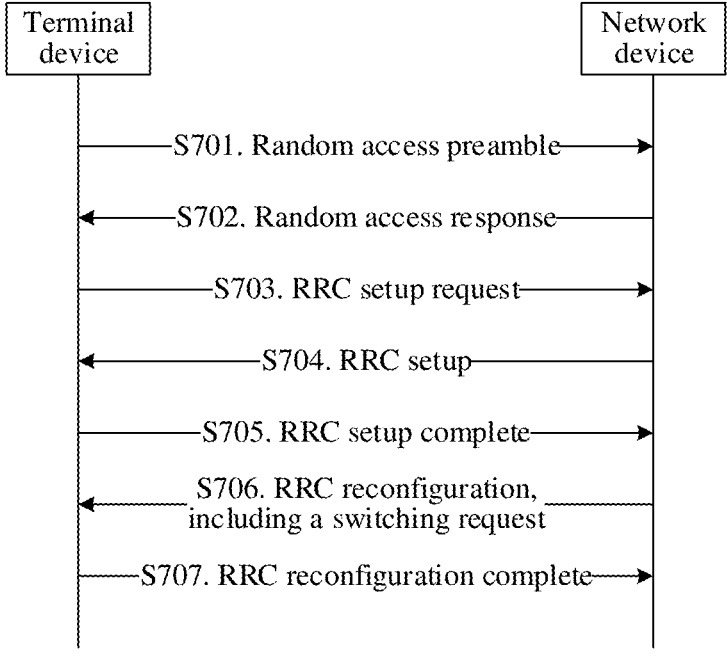
FIG. 7 is a schematic flowchart of still another carrier configuration method.

FIG. 7 is a schematic flowchart of another carrier configuration method according to an embodiment. This method is an improvement made based on random access initiated by a terminal device.

S701: A terminal device sends a random access preamble to a network device.

S702: The network device sends a random access response message to the terminal.

S703: The terminal device sends an RRC setup request message to the network device.

S704: The network device sends an RRC setup message to the terminal.

S705: The terminal device sends an RRC setup complete message to the network device.

S706: The network device sends an RRC reconfiguration message to the terminal device. After the terminal device completes the initial access, the network device adds a switching request to the first RRC reconfiguration message sent to the terminal device, that is, adds a switching request to S706. The switching request includes SSB information of a carrier that can be switched by the terminal device, for example, information such as a period, a frequency location, and a carrier spacing of the SSB. When the carrier that can be switched is an energy-saving carrier on which no SSB is sent, the network device indicates, when sending a switching request message to the terminal device, the original energy-saving carrier cell to send a first SSB, so that the original energy-saving carrier cell changes to a normal operating carrier, and the terminal device can find the first SSB and then access the original energy-saving carrier cell. When the terminal device successfully accesses the original energy-saving carrier cell, the first SSB may be disabled. When the carrier that can be switched is a third carrier on which only an SSB is sent and a sending period is different from that of a second carrier, the terminal device searches for a third SSB based on information about the third SSB in the switching request message, for example, a period of the third SSB, to perform access.

Optionally, the switching request may be added to another RRC reconfiguration message sent by the network device to the terminal device. For example, the terminal device is indicated to perform switching in the RRC reconfiguration message sent for the second time. To quickly access the energy-saving carrier, the switching request may be added to the first RRC reconfiguration message sent by the network device to the terminal device, and the RRC reconfiguration message sent for the second time is not needed to indicate the switching. Therefore, fast switching is implemented, and performance of the terminal device is ensured.

S707: The terminal device returns an RRC reconfiguration complete message.

The switching request is added to an initial access message, so that the network device indicates the terminal device to enter the switching procedure in advance in the initial access process, so that the terminal device can quickly switch to a first carrier cell or a third carrier cell. In this way, the terminal device may perform data transmission on a high-frequency carrier, and performance of the terminal device is ensured.

An embodiment may further provide an apparatus configured to implement any one of the foregoing methods. For example, an apparatus is provided. The apparatus includes a unit (or element) configured to implement each operation performed by the terminal in any one of the foregoing methods. For another example, another apparatus is further provided. The apparatus includes units (or element) configured to implement operations performed by the network device in any one of the foregoing methods.

Figure 8:
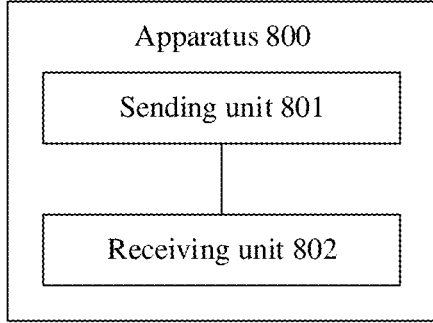
FIG. 8 is a schematic block diagram of a carrier configuration apparatus.

FIG. 8 is a schematic block diagram of a carrier configuration apparatus according to an embodiment. As shown in FIG. 8, the apparatus 800 may include a sending unit 801.

The sending unit 801 is configured to send measurement configuration information to a terminal device, where the measurement configuration information includes configuration information of an event A1, and the measurement configuration information indicates the terminal device to perform measurement for the event A1 in an RRC non-connected state.

Optionally, the sending unit 801 is further configured to send a radio resource control RRC release message to the terminal device, where the RRC release message includes the measurement configuration information.

Optionally, the measurement configuration information sent by the sending unit 801 may further include a period of a second SSB, and the second SSB is carried on a second carrier.

Optionally, the apparatus 800 may further include a receiving unit 802. The receiving unit is configured to receive a report of the event A1 sent by the terminal device. The sending unit is further configured to: send access configuration information to the terminal device based on the report of the event A1, where the access configuration information indicates the terminal device to access a first carrier; and send a first SSB based on the report of the event A1. The first SSB is carried on the first carrier, and the first carrier is different from the second carrier that carries the measurement configuration information.

Figure 9:
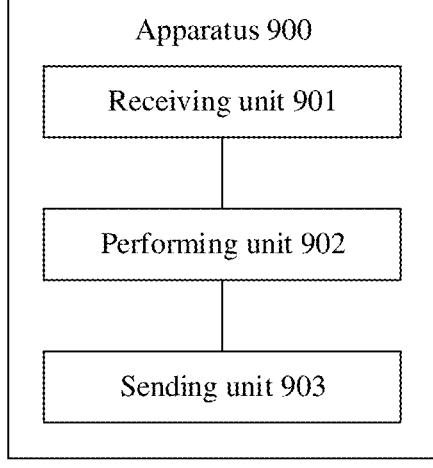
FIG. 9 is a schematic block diagram of another carrier configuration apparatus.

FIG. 9 is a schematic block diagram of another carrier configuration apparatus according to an embodiment. As shown in FIG. 9, the apparatus 900 may include a receiving unit 901 and a performing unit 902.

The receiving unit 901 is configured to receive measurement configuration information sent by a network device, where the measurement configuration information includes configuration information of an event A1. The performing unit 902 is configured to perform measurement of the event A1 in an RRC non-connected state based on the measurement configuration information.

Optionally, the receiving unit 901 may be further configured to receive an RRC release message sent by the network device, where the RRC release message includes the measurement configuration information.

Optionally, the receiving unit 901 may be further configured to receive a SIB message sent by the network device, where the SIB message includes the measurement configuration information.

Optionally, the measurement configuration information received by the receiving unit 901 may further include a period of a second SSB, and the second SSB is carried on a second carrier. The performing unit is further configured to search for the second SSB based on the period of the second SSB.

Optionally, the apparatus 900 may further include a sending unit 903, where the sending unit is configured to send a report of the event A1 to the network device. The receiving unit is further configured to receive access configuration information sent by the network device, where the access configuration information indicates the terminal device to access a first carrier, and the first carrier is different from the second carrier that carries the measurement configuration information. The performing unit is further configured to search for a first SSB, where the first SSB is carried on the first carrier.

An embodiment may further provide a carrier configuration apparatus, including the foregoing network device and one or more terminal devices.

This embodiment may further provide a non-transitory computer-readable storage medium. The non-transitory computer-readable storage medium stores instructions. When the instructions are run on a computer, the computer is enabled to perform the operations performed by the network device in the methods shown in FIG. 3 to FIG. 7.

The embodiments may further provide a non-transitory computer-readable storage medium. The non-transitory computer-readable storage medium stores instructions. When the instructions are run on a computer, the computer is enabled to perform the operations performed by the terminal device in the methods shown in FIG. 3 to FIG. 7.

The embodiments may further provide a computer program product that includes instructions. When the computer program product runs on a computer, the computer is enabled to perform the operations performed by the network device in the methods shown in FIG. 3 to FIG. 7.

The embodiments may further provide a computer program product that includes instructions. When the computer program product runs on a computer, the computer is enabled to perform the operations performed by the terminal device in the methods shown in FIG. 3 to FIG. 7.

Figure 10:
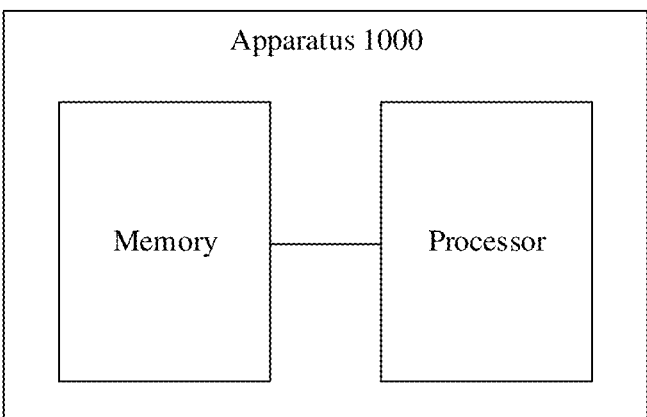
FIG. 10 is a schematic block diagram of yet another carrier configuration apparatus.

FIG. 10 is a schematic block diagram of another carrier configuration apparatus according to an embodiment. The apparatus 1000 includes a memory and a processor.

The processor in the apparatus is configured to read and run a computer program stored in the memory, and to perform a corresponding operation and/or procedure performed by the terminal device in the communication method. Optionally, the apparatus further includes a memory. The memory is connected to the processor through a circuit or a wire. The processor is configured to read and execute the computer program in the memory. Further optionally, the apparatus further includes a communication interface, and the processor is connected to the communication interface. The communication interface is configured to receive data and/or information that needs to be processed. The processor obtains the data and/or the information from the communication interface and processes the data and/or the information. The communication interface may be an input/output interface.

The embodiments may further provide an apparatus that includes a processor. The processor is configured to invoke and run a computer program stored in a memory, to perform a corresponding operation and/or procedure performed by the network device in the communication method. Optionally, the apparatus further includes the memory. The memory is connected to the processor through a circuit or a wire. The processor is configured to read and execute the computer program in the memory. Further optionally, the apparatus further includes a communication interface, and the processor is connected to the communication interface. The communication interface is configured to receive data and/or information that needs to be processed. The processor obtains the data and/or the information from the communication interface, and processes the data and/or the information. The communication interface may be an input/output interface.

In the foregoing embodiments, the processor may be a central processing unit (CPU), a microprocessor, an application-specific integrated circuit (ASIC), one or more integrated circuits configured to control execution of programs. For example, the processor may be a digital signal processor device, a microprocessor device, an analog-to-digital converter, or a digital-to-analog converter. The processor may allocate control and signal processing functions of a terminal device or a network device among these devices based on respective functions of these devices. In addition, the processor may have a function of operating one or more software programs, and the software program may be stored in the memory. The functions of the processor may be implemented by hardware, or may be implemented by hardware executing corresponding software. The hardware or the software includes one or more modules corresponding to the foregoing function.

The memory may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile optical disc, a Blu-ray disc, and the like), a magnetic disk storage medium or another magnetic storage device, any other medium that can be used to carry or store expected program code in a form of instructions or a data structure and that can be accessed by a computer, or the like.

Optionally, the memory and the processor in the foregoing embodiments may be physically independent units, or the memory may be integrated with the processor.

A person of ordinary skill in the art may be aware that, in combination with the examples described in the embodiments, units and algorithm operations may be implemented by electronic hardware or a combination of computer software and electronic hardware. Whether the functions are performed by hardware or software depends on particular applications and constraint conditions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, the system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units may be integrated into one processing unit, each of the units may exist alone physically, or two or more units may be integrated into one unit.

When the functions are implemented in the form of a software functional unit and sold or used as an independent product, the functions may be stored in a non-transitory computer-readable storage medium. Based on such an understanding, the embodiments may be implemented in a form of a software product. The computer software product is stored in a non-transitory storage medium and includes several instructions for instructing a computer device (which may be a personal computer, a server, or a network device) to perform all or some of the operations of the methods described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations, but are not intended to limit the scope of the embodiments. Any variation or replacement readily figured out by a person skilled in the art shall fall within to the scope of the embodiments.

What is claimed is:

1. A method comprising:
sending, by a network device, measurement configuration information to a terminal device, wherein the measurement configuration information comprises configuration information of an event A1, and the measurement configuration information indicates the terminal device to perform measurement for the event A1 in a radio resource control (RRC) non-connected state;
receiving, by the network device, a report of the event A1 sent by the terminal device, wherein the terminal device reports a measurement result of broadcast signal quality of a cell accessed by the terminal device and a measured signal quality exceeds a preset threshold in the event A1;
sending, by the network device, access configuration information to the terminal device based on the report of the event A1, wherein the access configuration information indicates the terminal device to access a first carrier; and
subsequently sending, by the network device, a first synchronization signal broadcast channel block (SSB) based on the report of the event A1, wherein the first SSB is carried on the first carrier, and the first carrier is different from a second carrier that carries the measurement configuration information.

2. The method according to claim 1, wherein sending, by the network device, the measurement configuration information to the terminal device further comprises:
sending, by the network device, an RRC release message to the terminal device, wherein the RRC release message comprises the measurement configuration information.

3. The method according to claim 1, wherein sending, by the network device, the measurement configuration information to the terminal device further comprises:
sending, by the network device, a system information block (SIB) message to the terminal device, wherein the SIB message comprises the measurement configuration information.

4. The method according to claim 1, wherein the measurement configuration information further comprises a period of a second SSB, and the second SSB is carried on the second carrier.

5. A carrier configuration method, comprising:

receiving, by a terminal device, measurement configuration information sent by a network device, wherein the measurement configuration information comprises configuration information of an event A1;

performing, by the terminal device, measurement for the event A1 in a radio resource control (RRC) non-connected state based on the measurement configuration information;

sending, by the terminal device, a report of the event A1 to the network device, wherein the terminal device reports a measurement result of broadcast signal quality of a cell accessed by the terminal device and a measured signal quality exceeds a preset threshold in the event A1;

receiving, by the terminal device, access configuration information sent by the network device, wherein the access configuration information indicates the terminal device to access a first carrier; and subsequently searching, by the terminal device, for a first synchronization signal broadcast channel block (SSB), wherein the first SSB is carried on the first carrier, and the first carrier is different from a second carrier that carries the measurement configuration information.

6. The carrier configuration method according to claim 5, wherein receiving, by the terminal device, the measurement configuration information sent by the network device further comprises:

receiving, by the terminal device, an RRC release message sent by the network device, wherein the RRC release message comprises the measurement configuration information.

7. The carrier configuration method according to claim 5, wherein receiving, by the terminal device, the measurement configuration information sent by the network device further comprises:

receiving, by the terminal device, a system information block (SIB) message sent by the network device, wherein the SIB message comprises the measurement configuration information.

8. The carrier configuration method according to claim 5, wherein the measurement configuration information further comprises a period of a second SSB, and the second SSB is carried on the second carrier; and the method further comprises:

searching for the second SSB based on the period of the second SSB.

9. A carrier configuration apparatus, comprising:

a transceiver;

at least one processor; and one or more memories coupled to the at least one processor and storing programming instructions, when executed by the at least one processor, cause the carrier configuration apparatus to:

send measurement configuration information to a terminal device, wherien the measurement configuration information comprises configuration information of an event A1, and the measurement configuration information indicates the terminal device to perform measurement for the event A1 in a radio resource control (RRC) non-connected state;

receive a report of the event A1 sent by the terminal device, wherein the terminal device reports a measurement result of broadcast signal quality of a cell accessed by the terminal device and a measured signal quality exceeds a preset threshold in the event A1;

send access configuration information to the terminal device based on the report of the event A1; and subsequently send a first synchronization signal broadcast channel block (SSB), wherein the access configuration information indicates the terminal device to access a first carrier, the first SSB is carried on the first carrier, and the first carrier is different from a second carrier that carries the measurement configuration information.

10. The carrier configuration apparatus according to claim 9, wherein the programming instructions, when executed by the at least one processor, further cause the apparatus to send a radio resource control (RRC) release message to the terminal device, wherein the RRC release message comprises the measurement configuration information.

11. The carrier configuration apparatus according to claim 9, wherein the programming instructions, when executed by the at least one processor, further cause the apparatus to send a system information block (SIB) message to the terminal device, wherein the SIB message comprises the measurement configuration information.

12. The carrier configuration apparatus according to claim 9, wherein the measurement configuration information further comprises a period of a second SSB, and the second SSB is carried on the second carrier.

13. A carrier configuration apparatus, comprising:

a transceiver;

at least one processor; and one or more memories coupled to the at least one processor and storing programming instructions, when executed by the at least one processor, cause the carrier configuration apparatus to:

receive measurement configuration information sent by a network device, wherein the measurement configuration information comprises configuration information of an event A1;

perform measurement for the event A1 in a radio resource control (RRC) non-connected state based on the measurement configuration information;

send a report of the event A1 to the network device, wherein the carrier configuration apparatus reports a measurement result of broadcast signal quality of a cell accessed by the carrier configuration apparatus and a measured signal quality exceeds a preset threshold in the event A1;

receive access configuration information sent by the network device, wherein the access configuration information indicates the apparatus to access a first carrier, and the first carrier is different from a second carrier that carries the measurement configuration information; and subsequently search for a first synchronization signal broadcast channel block (SSB), wherein the first SSB is carried on the first carrier.

14. The carrier configuration apparatus according to claim 13, wherein the programming instructions, when executed by the at least one processor, further cause the apparatus to receive an RRC release message sent by the network device, wherein the RRC release message comprises the measurement configuration information.

15. The carrier configuration apparatus according to claim 13, wherein the programming instructions, when executed by the at least one processor, further cause the apparatus to receive a system information block (SIB) message sent by the network device, wherein the SIB message comprises the measurement configuration information.

16. The carrier configuration apparatus according to claim 13, wherein the measurement configuration information further comprises a period of a second SSB, and the second SSB is carried on the second carrier; and the programming instructions, when executed by the at least one processor, further cause the apparatus to search for the second SSB based on the period of the second SSB.

\* \* \* \* \*